(12) United States Patent
Zavodny et al.

(10) Patent No.: US 9,482,583 B1
(45) Date of Patent: Nov. 1, 2016

(54) AUTOMATED HELIOSTAT REFLECTIVITY MEASUREMENT SYSTEM

(71) Applicant: eSolar, Inc., Burbank, CA (US)

(72) Inventors: Maximilian Ted Zavodny, Pasadena, CA (US); Michael David Slack, South Pasadena, CA (US)

(73) Assignee: ESOLAR, INC., Burbank, CA (US)

( * ) Notice: Subject to any disclaimer, the term of this patent is extended or adjusted under 35 U.S.C. 154(b) by 408 days.

(21) Appl. No.: 13/644,332

(22) Filed: Oct. 4, 2012

Related U.S. Application Data

(60) Provisional application No. 61/543,923, filed on Oct. 6, 2011.

(51) Int. Cl.
*G06K 9/00* (2006.01)
*G01K 7/00* (2006.01)
*G01J 5/12* (2006.01)

(52) U.S. Cl.
CPC ....................................... *G01J 5/12* (2013.01)

(58) Field of Classification Search
CPC .............. F24J 2002/108; F24J 2002/385; F24J 2002/5451; F24J 2002/5462; F24J 2002/5468; F24J 2/07; F24J 2/12; F24J 2/18; F24J 2/38; F24J 2/5264; F24J 2/541; F24J 2/5424; G01C 21/02; H01L 31/0422
See application file for complete search history.

(56) References Cited

U.S. PATENT DOCUMENTS

| | | | | |
|---|---|---|---|---|
| 4,679,948 A * | 7/1987 | Hempowitz | ............ | G01J 5/061 219/502 |
| 4,722,612 A * | 2/1988 | Junkert | ............ | G01J 5/02 136/230 |
| 4,893,663 A * | 1/1990 | Ely | ............ | B27L 5/02 144/213 |
| 5,005,958 A * | 4/1991 | Winston | ............ | F24J 2/06 126/685 |
| 5,296,706 A * | 3/1994 | Braig | ............ | G01N 21/3581 250/339.13 |
| 6,423,285 B1 * | 7/2002 | Itoi | ............ | C30B 15/305 117/30 |
| 6,537,605 B1 * | 3/2003 | Kirchner | ............ | C23C 4/12 118/302 |

(Continued)

OTHER PUBLICATIONS

Ballestrin et al ("Hybrid heat flux measurement system for solar central receiver evaluation", 2004).*

*Primary Examiner* — Avinash Yentrapati
(74) *Attorney, Agent, or Firm* — Brooks Acordia IP Law, P.C.; Pejman Yedidsion

(57) ABSTRACT

Methods and systems for measuring heliostat reflectivity with a control processing unit configured to receive an image of a heliostat, receive an image of the Sun, process the received images, and determine a reflectivity estimate based on a comparison of the processed images.

9 Claims, 9 Drawing Sheets

(56) References Cited

U.S. PATENT DOCUMENTS

| | | | |
|---|---|---|---|
| 8,405,786 B2* | 3/2013 | Mellor | G01T 7/00 348/42 |
| 8,669,509 B1* | 3/2014 | Gupta | G01J 1/4228 250/203.4 |
| 2003/0060717 A1* | 3/2003 | Kraus | G01J 5/02 600/474 |
| 2004/0052296 A1* | 3/2004 | Kuball | G01J 5/0096 374/120 |
| 2007/0173727 A1* | 7/2007 | Naghavi | A61B 5/01 600/483 |
| 2007/0225614 A1* | 9/2007 | Naghavi | A61B 5/01 600/549 |
| 2008/0095212 A1* | 4/2008 | Jonnalagadda | G01J 5/0003 374/124 |
| 2008/0135095 A1* | 6/2008 | Cummings | H01L 31/0547 136/259 |
| 2008/0187648 A1* | 8/2008 | Hart | B01J 23/745 427/8 |
| 2008/0236568 A1* | 10/2008 | Hickerson | F24J 2/38 126/578 |
| 2009/0107485 A1* | 4/2009 | Reznik | F24J 2/07 126/600 |
| 2009/0219969 A1* | 9/2009 | Yamamoto | G01K 5/486 374/29 |
| 2009/0241939 A1* | 10/2009 | Heap | F22B 1/006 126/645 |
| 2009/0296775 A1* | 12/2009 | Yamaguchi | G01J 5/04 374/121 |
| 2010/0031952 A1* | 2/2010 | Zavodny | F24J 2/07 126/573 |
| 2010/0102235 A1* | 4/2010 | Haveri | G01J 5/04 250/343 |
| 2011/0000478 A1* | 1/2011 | Reznik | F24J 2/16 126/574 |
| 2011/0017903 A1* | 1/2011 | Fangman | F24J 2/1047 250/203.4 |
| 2011/0155119 A1* | 6/2011 | Hickerson | F24J 2/38 126/574 |
| 2011/0241549 A1* | 10/2011 | Wootton | F21S 8/006 315/117 |
| 2013/0021471 A1* | 1/2013 | Waterhouse | F24J 2/38 348/139 |
| 2013/0170046 A1* | 7/2013 | Winston | G02B 17/006 359/641 |
| 2014/0036953 A1* | 2/2014 | Kimura | G01J 5/16 374/121 |
| 2014/0077086 A1* | 3/2014 | Batkilin | G01T 1/20 250/369 |
| 2014/0369386 A1* | 12/2014 | Radhakrishnan | G01K 7/02 374/179 |
| 2015/0072729 A1* | 3/2015 | Hoeschen | G01T 1/026 455/556.1 |
| 2015/0148681 A1* | 5/2015 | Abreu | A61B 5/0008 600/474 |

* cited by examiner

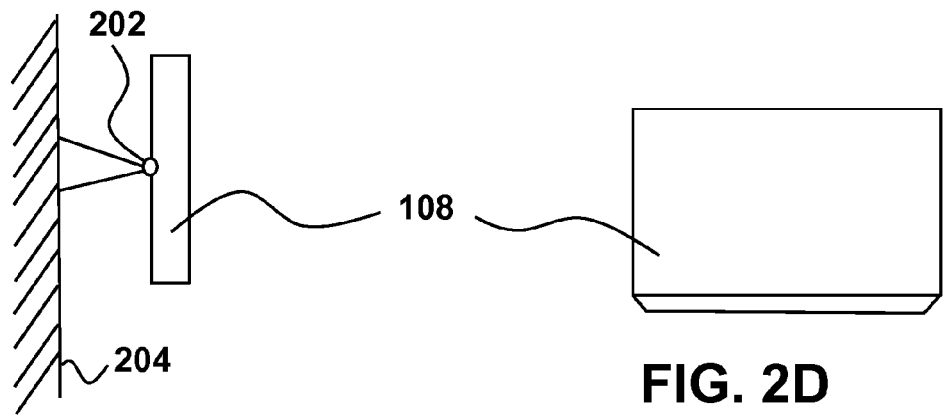
FIG. 2A
FIG. 2D
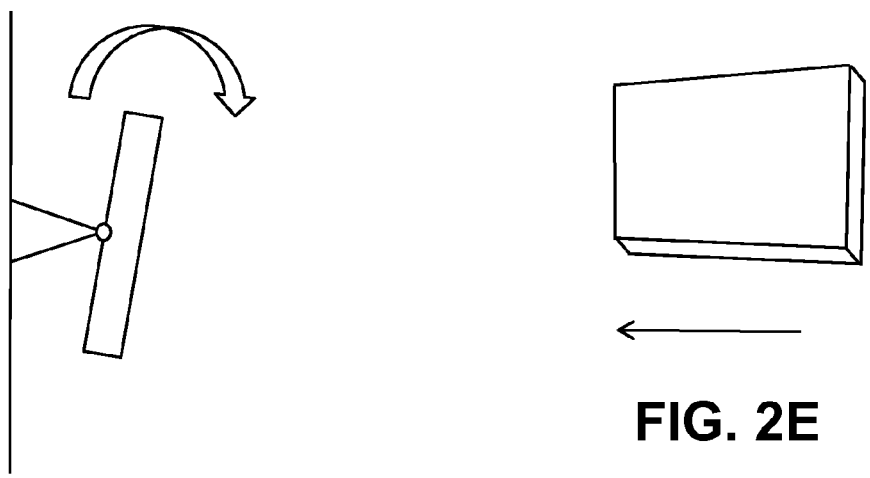
FIG. 2B
FIG. 2E
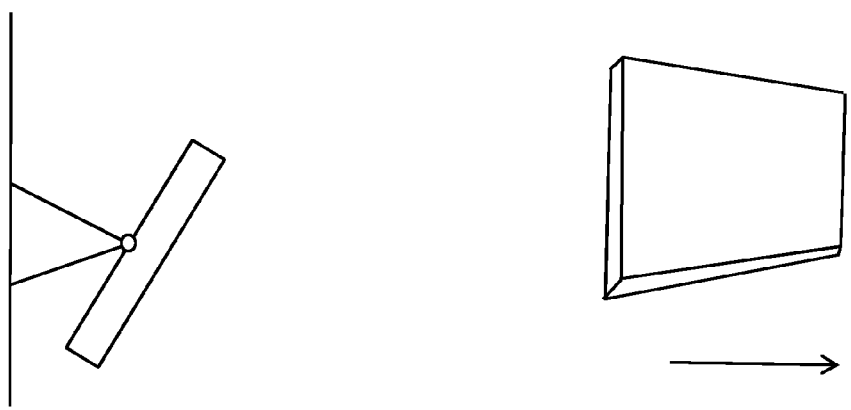
FIG. 2C
FIG. 2F

AUTOMATED HELIOSTAT REFLECTIVITY MEASUREMENT SYSTEM

CROSS-REFERENCE TO RELATED APPLICATIONS

This application claims priority to and the benefit of U.S. Provisional Patent Application Ser. No. 61/543,923, filed Oct. 6, 2011, which is hereby incorporated by reference in its entirety for all purposes.

TECHNICAL FIELD

The invention relates to the field of concentrated solar thermal power and heliostat fields and more particularly to devices, systems, and methods for measuring the reflectivity of portions of solar collector arrays.

BACKGROUND

The performance of a solar thermal power system is dependent on the magnitude of the solar flux delivered by a heliostat field. Many factors affect the delivered flux, including, for example, the soiling of heliostat mirrors by dust or other contaminants.

Measuring the reflectivity of a heliostat field is a difficult task using prior art. Standard practice is to position a handheld reflectometer on the surface of each heliostat to be tested. This process is time-consuming and expensive, but more importantly it is subject to systematic biases. The users of the device may systematically choose parts of the mirror to measure that are clearer or dirtier than average, depending on their incentives. Furthermore, such devices typically only sample a subset of the solar spectrum and do not necessarily measure the amount of light reflected in a solid angle that is most relevant to the solar thermal application.

SUMMARY

Exemplary device embodiments may include a thermopile, where the thermopile has radiation shielding, and a camera configured to produce digital imagery. The thermopile may be connected proximate to the camera and the field of view of the thermopile may be within the field of view of the camera. The radiation shielding of the thermopile may have an opening disposed in a plane perpendicular to the aperture of the camera. The camera may have a neutral density filter, have a resolution of at least five megapixels, and/or be a pinhole camera. The device may have at least one gimbal for re-orienting the device.

An exemplary system embodiment may have a control processing unit having a processor and addressable memory where the control processing unit may be configured to receive an image from an imaging device that has a field of view, receive a reading of total energy absorbed by a thermopile that has a field of view within the field of view of the imaging device, determine a total number of pixels in the received image that contain part of a image of the solar disc, and determine a reflectivity estimate based on the determined total number of pixels in the received image that contain part of the image of the solar disc and the received reading of total energy absorbed by the thermopile. In other embodiments, the determined reflectivity estimate may be further based on an angular size of a pixel in the received image and a surface brightness of the solar disc. In additional embodiments, the control processing unit may be further configured to calibrate the angular size of a pixel based on the number of pixels in a received image of an object with a known size and where the object is a known distance from the imaging device. In additional embodiments, the control processing unit may be further configured to receive a measurement of the direct normal insolation provided by the solar disc, receive an angular size of the solar disc, and determine the surface brightness of the solar disc based on the received measurements of direct normal insolation and angular size. In further embodiments, the control processing unit may be further configured to determine a scaling factor based on a received reading of total energy absorbed by a thermopile for a received image of a surface with known reflectivity. The determined reflectivity estimate may be further based on the scaling factor. In additional embodiments, the scaling factor may be the product of the total number of pixels in the received image containing part of an image of the solar disc and the known reflectivity of the surface divided by the received reading of total energy absorbed by the thermopile. In additional embodiments, the determined reflectivity estimate may be the received reading of total energy absorbed by the thermopile divided by the product of the total number of pixels in the received image containing part of an image of the solar disc and the scaling factor. In additional embodiments, the determined reflectivity estimate may be the received reading of total energy absorbed by the thermopile divided by the product of the total number of pixels in the received image containing part of an image of the solar disc, the angular size of a pixel in the received image, and the surface brightness of the solar disc.

Another exemplary system embodiment may have a control processing unit having a processor and addressable memory where the control processing unit may be configured to receive an image of a heliostat from a imaging device having a field of view taken at a first point in time; receive an image of the Sun from the imaging device having a field of view taken at a second time; determine a brightness of the received image of the heliostat; determine a brightness of the received image of the Sun; and determine a reflectivity estimate based on a comparison of the determined brightness of the received image of the heliostat and the determined brightness of the received image of the Sun. In additional embodiments, the control processing unit may be further configured to: receive a measurement of the direct normal insolation provided by the Sun at the first point in time; receive a measurement of the direct normal insolation provided by the Sun at the second time; scale the brightness of the received image of the heliostat based on the received measurement of the direct normal insolation provided by the Sun at the first point in time; and scale the brightness of the received image of the Sun based on the received measurement of the direct normal insolation provided by the Sun at the second time. In additional embodiments, the determined brightness of the received image of the heliostat and the determined brightness of the received image of the Sun may be a Pixel Intensity Metric (PIM), where the control processing unit is further configured to determine PIM by detecting a blob of the Sun in a received image, eroding away pixels on the edge of the blob, and calculating an average pixel value from the remainder. In additional embodiments, the control processing unit may be further configured to: process the received image of a heliostat from the imaging device having a field of view taken at the first point in time; and process the received image of the Sun from the imaging device having a field of view taken at the second time; where the processing is based on at least one of: a camera calibration constant, a camera non-flatness correction profile, a camera non-linear response correction profile, and a camera bias subtraction.

BRIEF DESCRIPTION OF THE DRAWINGS

Embodiments are illustrated by way of example and not limitation in the figures of the accompanying drawings, in which:

FIGS. 2A-2F depict the positioning of an exemplary reflectivity measurement system;

DETAILED DESCRIPTION

Figure 1:
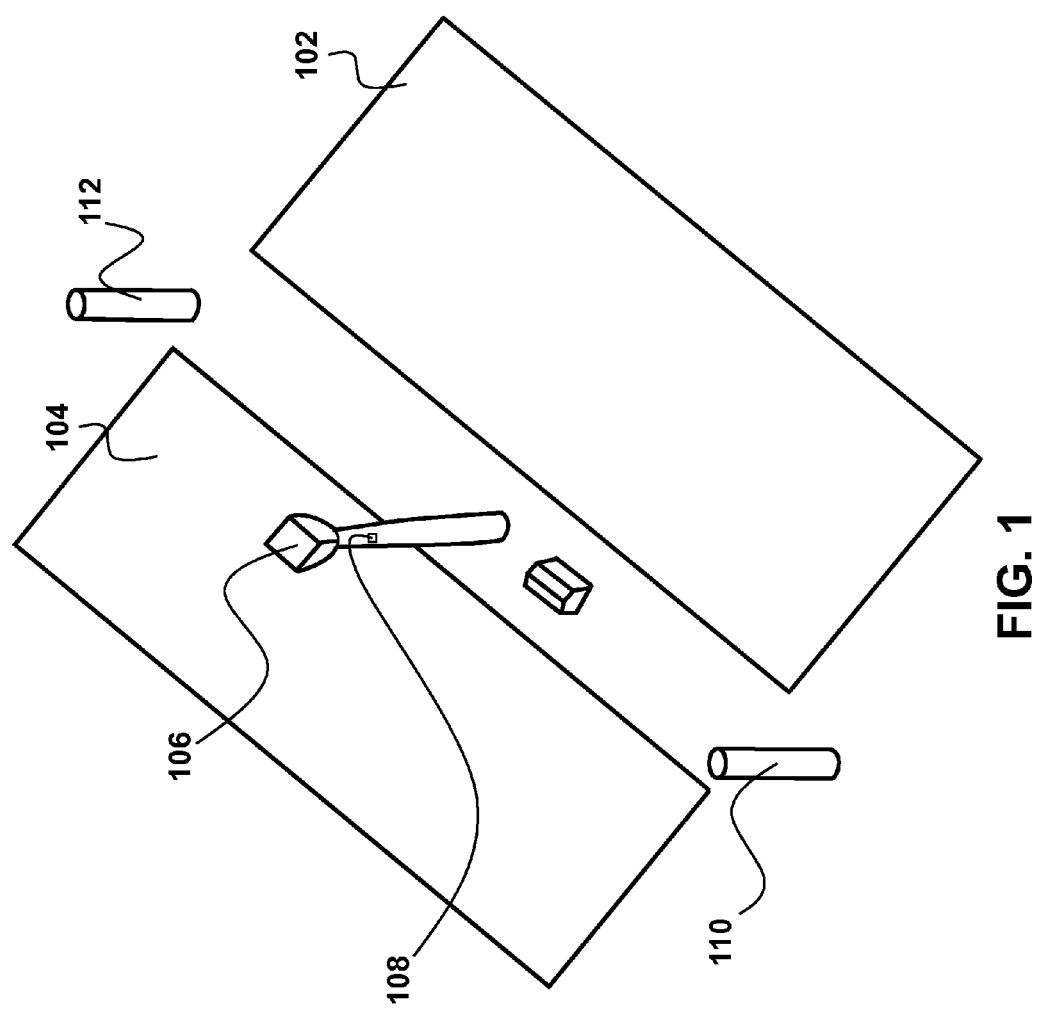
FIG. 1 depicts an exemplary reflectivity measurement system connected to a solar thermal receiver positioned between two heliostat arrays.

FIG. 1 depicts an exemplary reflectivity measurement system 108 connected to a solar thermal receiver 106 positioned between a first heliostat array 102 and a second heliostat array 104. In an exemplary embodiment utilizing a tower, the reflectivity measurement system 108 may be mounted on a solar thermal receiver 106 at an elevation providing a field of view of one or more heliostat arrays 102,104. Mounting the reflectivity measurement system 108 in such an elevated and/or central position may reduce the movement required by the heliostats of the one or more heliostat arrays 102,104 to be measured. The reflectivity measurement system 108 may be fixed in position or may be connected by a mount, e.g., a gimbal, to an outer surface of the solar thermal receiver 106 allowing for the rotation of the reflectivity measurement system 108 about two or more axis. In an alternative embodiment, the reflectivity measurement system 108 may be mounted on preexisting structures such as a first separate tower 110 and/or a second separate tower 112, e.g., camera towers, that are proximate to the one or more heliostat arrays 102,104.

FIGS. 2A-2F depict the positioning of an exemplary reflectivity measurement system 108. The reflectivity measurement system 108 may be fixed directly (not shown) to a mounting surface 204 or may be attached to the mounting surface 204 via a gimbal 202. Calibration of the reflectivity measurement system 108 may be readily effected when the reflectivity measurement system 108 is gimbaled and repeatedly reoriented. In an exemplary embodiment, the reflectivity measurement system 108 may be aimed at the Sun in order to determine the direct normal insolation (DNI) provided by the Sun (see FIG. 4B). FIG. 2A depicts a side view of an exemplary reflectivity measurement system 108 having movement about at least two axis. The reflectivity system 108 may be re-oriented along a vertical axis, as in FIG. 2B, to a new position, e.g., aimed at a selected heliostat, as in FIG. 2C. FIG. 2D depicts a front view of an exemplary reflectivity measurement system 108. The reflectivity measurement system may be re-oriented along a horizontal axis to align with one or more heliostats of a heliostat array, as in FIGS. 2E-2F.

Figure 3:
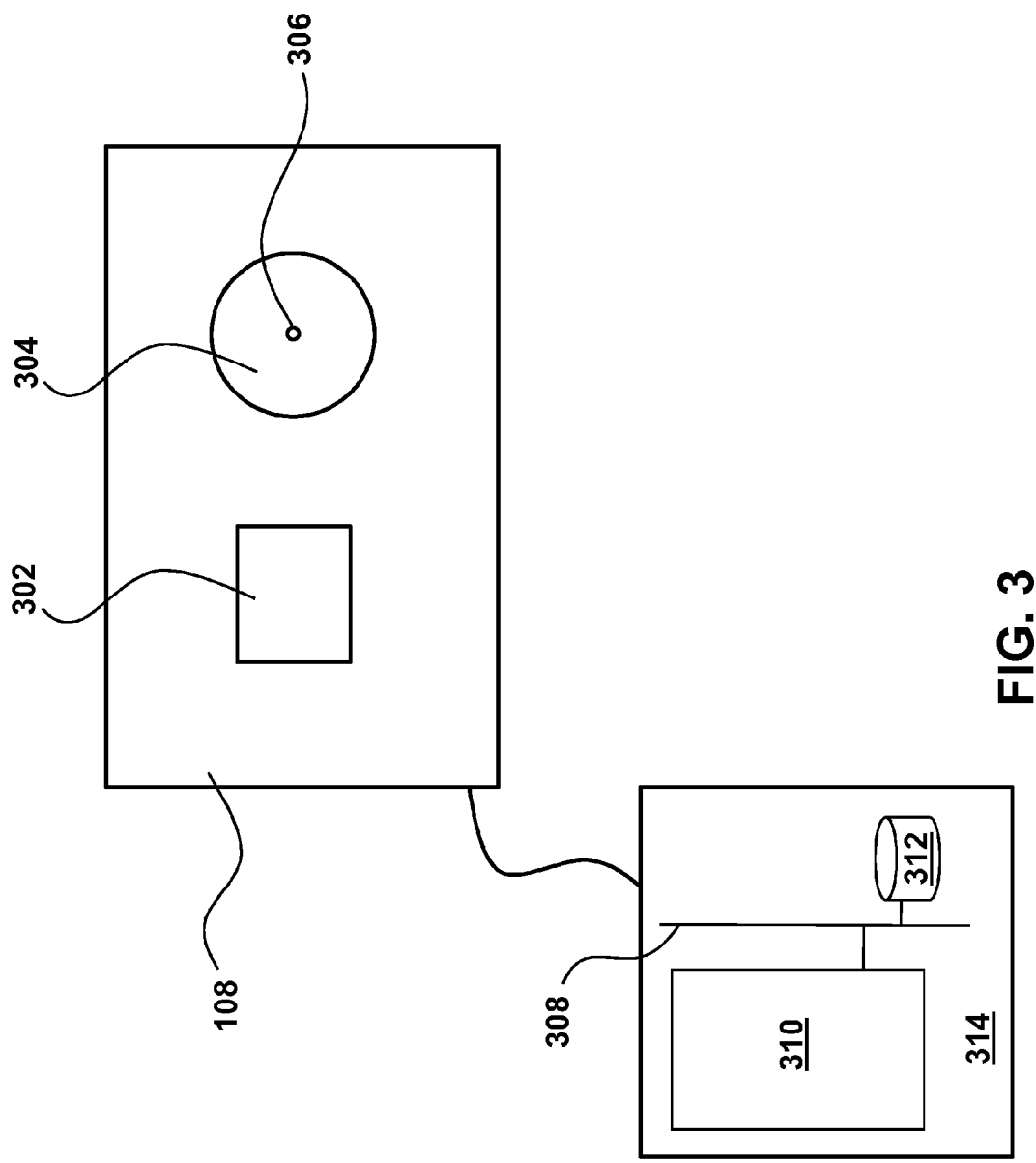
FIG. 3 depicts an exemplary reflectivity measurement system.

FIG. 3 depicts an exemplary reflectivity measurement system 108 embodiment. The system may be constructed by rigidly mounting a thermopile 302 immediately adjacent to a camera 304, e.g., within 10 cm, where the thermopile 302 and the camera 304 face in the same direction. The thermopile 302 may be shielded from all radiation except for a subset of the light that enters from a set of directions that are also visible in the field of view of the camera 304. The reflectivity measurement system 108 may be connected to one or more control processing units 314 having a processor 310 and memory 312 addressable with a data bus 308. The one or more processing units 314 may be used to determine values, e.g., a solar disc pixel count and a reflectivity estimate, based on inputs from the camera 304 and the thermopile 302. This reflectivity measurement system 108 may then be mounted in a location, in the vicinity of one or more heliostat arrays, and aimed at a set of one or more heliostats in the one or more heliostat arrays, such that the set of targeted heliostats reflects sunlight into the camera 304 and simultaneously onto the thermopile 302. The camera 304 may feature a small aperture 306 and/or a neutral density filter to prevent damage to an imaging sensor of the camera 304 from flux, flaring, or other distortion of the image.

A challenge in estimating the number of pixels with Sun presence is that some pixels may contain only a part of the image of the Sun. For this reason, a high-resolution camera 304, e.g., 5 or more megapixels, may be used to capture images of the Sun reflected in the one or more heliostats. The ratio of the number of edge pixels to non-edge pixels in the image of the Sun is directly proportional to the angular length of each pixel. The number of "edge" pixels, and hence, the opportunity for error, diminishes in higher resolution images, because the total number of pixels with Sun presence scales as the square of the angular length of each pixel. The angular size of a pixel may be provided by the camera manufacturer. Otherwise, it may be calibrated by imaging objects of known sizes at known distances from the camera.

The amount of absorbed radiation is measured using a thermopile 302. In order to accurately measure a quantity relevant to solar thermal power plants, it is appropriate for this device to include power over all wavelengths, or to use a device painted with a similar material, as is used on the surface of the solar receiver. If this system is used to determine effective reflectivity for a concentrated photovoltaic application, the thermopile 302 may be replaced with a photometer which integrates over the solar spectrum weighted by an approximation of the sensitivity of the photovoltaic receiver.

Figure 4A:
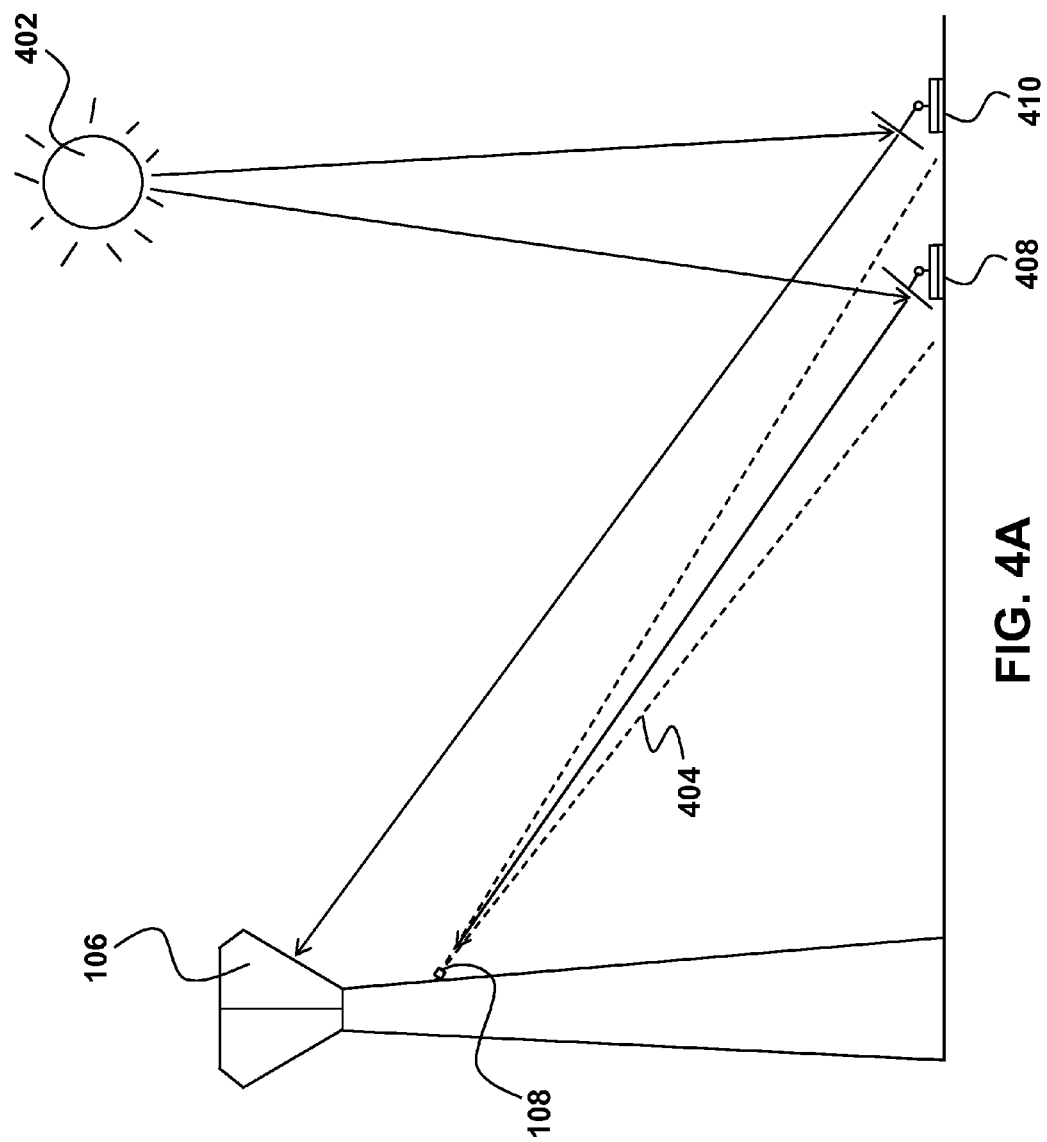
FIG. 4A is a view of an exemplary solar thermal power system with a reflectivity measurement system measuring heliostat field reflectivity.

FIG. 4A is a view of an exemplary solar thermal power system with a reflectivity measurement system 108 measuring heliostat field reflectivity. To obtain an estimate of heliostat reflectivity, the heliostat to be measured 408 may be reoriented to be aimed at the reflectivity measurement system 108. The reflectivity measurement system 108 may be repositioned to point towards the heliostat to be measured 408 (see FIGS. 2A-2F) such that the surface of the heliostat to be measured 408 is within the field of view 404 of the reflectivity measurement system 108. In some embodiments, additional heliostats 410 may continue to reflect flux from the Sun 402 onto a solar thermal receiver 106.

The reflectivity measurement system 108 uses one or more processing units having a processor and memory addressable with a data bus to estimate heliostat field reflectivity by taking in measurements from a thermopile in combination with a digital camera. The reflectivity measurement system 108 may be positioned relatively very far, e.g., 100 m, from the heliostat to be tested 408. By comparing the solid angle of sunlight as seen by the camera to the heat received by the thermopile, an estimate of reflectivity may be made.

Figure 4B:
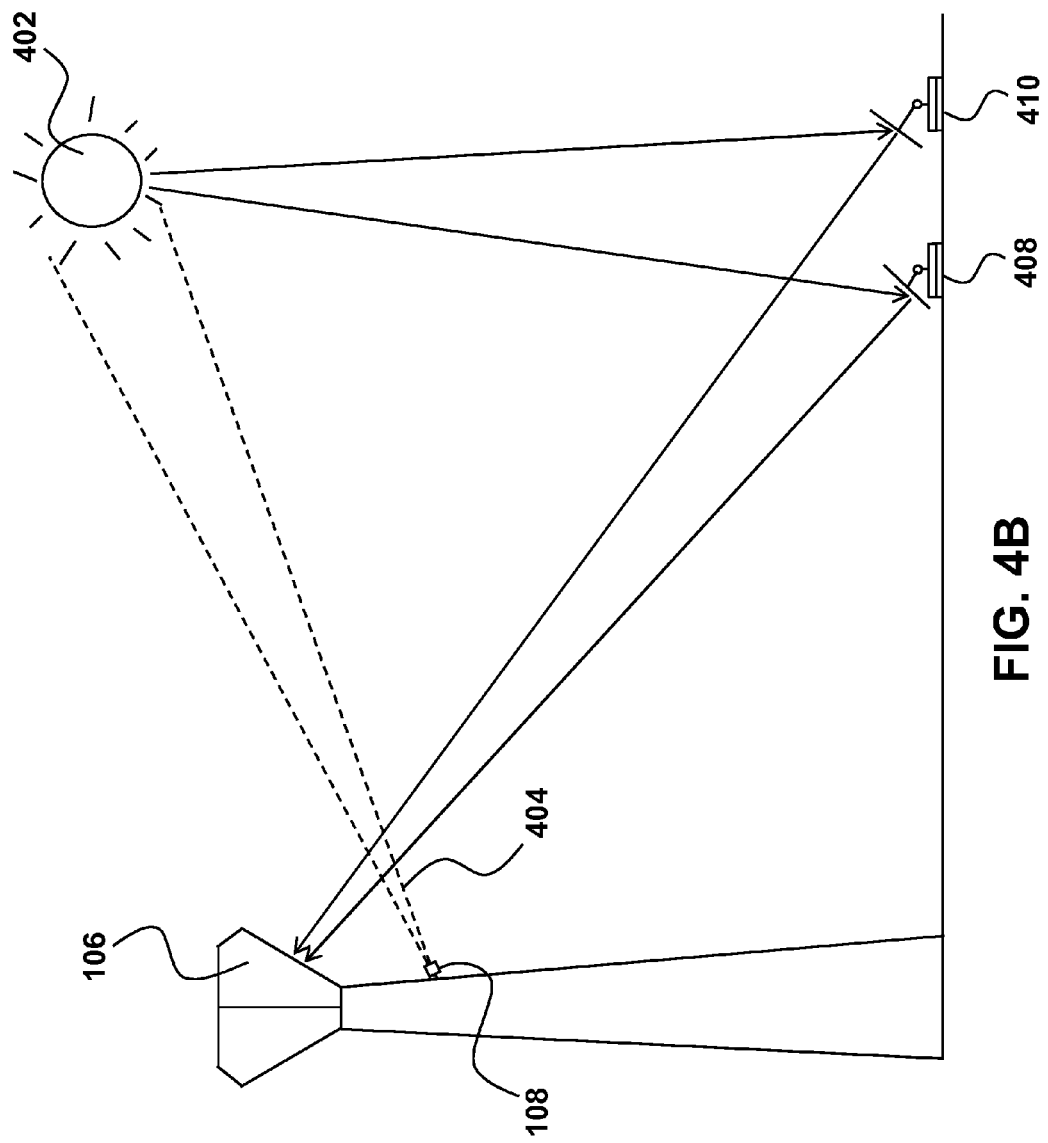
FIG. 4B is a view of an exemplary solar thermal power system with a reflectivity measurement system measuring direct normal insolation provided by the Sun.

FIG. 4B is a view of an exemplary solar thermal power system with a reflectivity measurement system 108 measuring DNI provided by the Sun 402. The surface brightness of the Sun 402 is the total amount of DNI provided by the Sun divided by the angular size of the Sun. The angular size of the Sun 402 is well known, and may be determined for a given time point from astronomical data. The DNI may be measured by either aiming the field of view 404 of this system, e.g., the sensor suite that may comprise at least one of the thermopile and the digital camera, directly at the Sun 402 frequently, or by using a separate system dedicated to measuring this quantity, e.g., a pyrheliometer or a well-calibrated camera mounted on a tracking device (not shown). The heliostats 408,410 of the at least one heliostat array may continue to reflect flux from the Sun 402 onto a solar thermal receiver 106, while the DNI is measured by the reflectivity measurement sensor 108. If the atmosphere between the camera and the reflector surface being measured is not transparent, the attenuation of sunlight along this path may also be taken into account when estimating the expected radiation. Devices to measure the transmission of the atmosphere are readily available for purchase. Expected radiation should be scaled as:

Expected radiation including attenuation=Expected radiation otherwise*exp(−Distance between camera and heliostat/Length over which sunlight loses 1/e of its intensity due to atmospheric interference)

Figure 5:
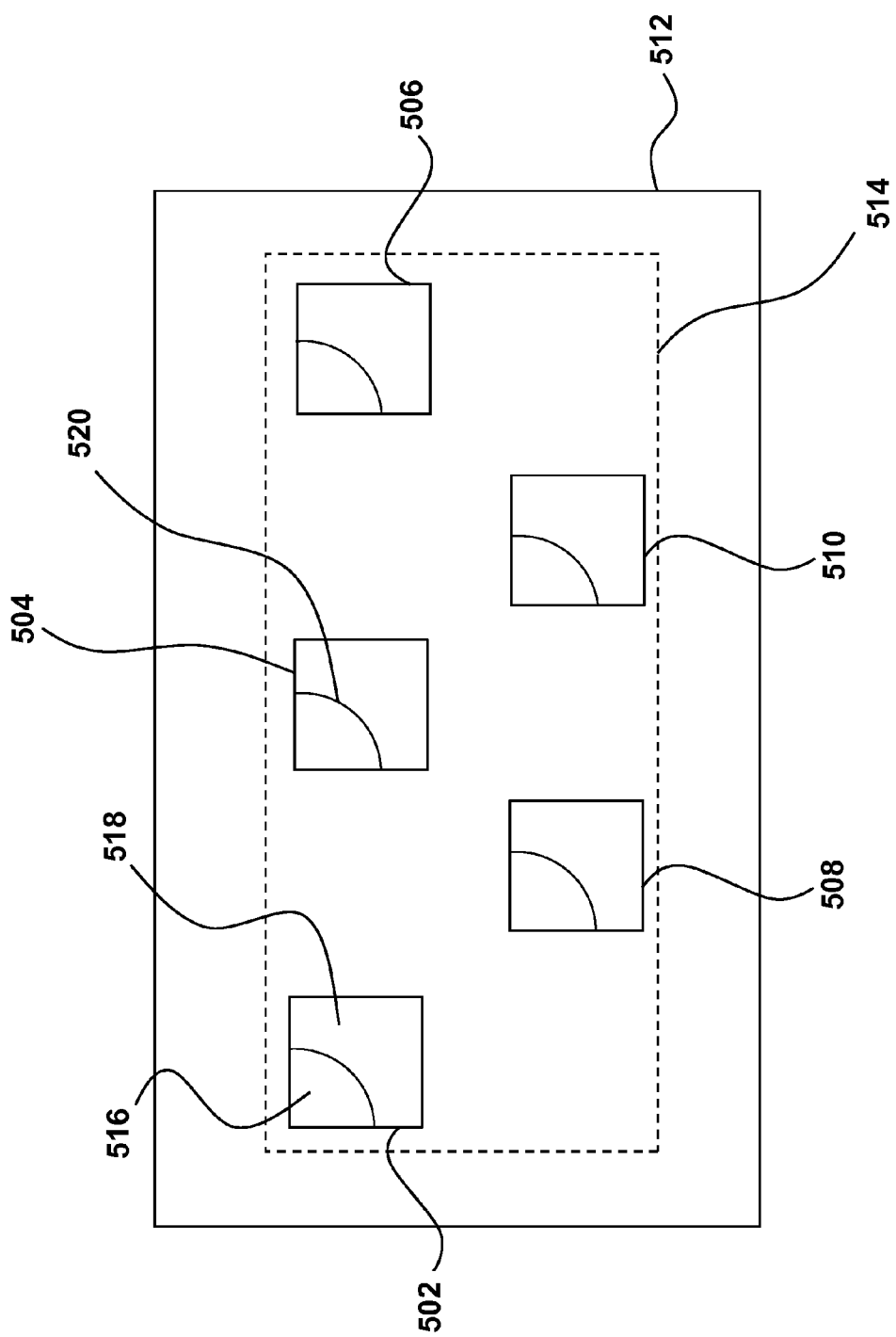
FIG. 5 is an exemplary digital image of a plurality of heliostats.

FIG. 5 is an exemplary digital image of a plurality of heliostats 502,504,506,508,510. The thermopile measurement area 514 must be less than the field of view of the camera 512 to obtain an accurate reading. In some embodiments, more than one heliostat 502,504,506,508,510 at a time may be measured. A reflectivity estimate may be calculated by dividing the total amount of energy absorbed by the thermopile by the total number of pixels in the camera's image which contain part of an image of the Sun, and scaling the result appropriately:

Reflectivity=(Absorbed Radiation)/(Expected Radiation for a perfectly reflective surface)=(Absorbed Radiation)/((Number of pixels with Sun presence)*(Solid angular size of a pixel)*(Surface brightness of the Sun as seen from the location of the experiment)

In the above equation, a key observation is that the amount of radiation expected is directly proportional to the number of pixels with Sun presence in the camera's image. The reason why this holds is because the Sun has nearly uniform surface brightness—neglecting, of course, the limb darkening effect. As viewed from a camera, the image of the Sun on a flat reflector will appear as a nearly circular disk, independent of the orientation of this surface with respect to either the Sun or the camera, and independent of the distance between the reflector and the camera. The pixels containing an image of the Sun 516 form a nearly circular disk around the pixels containing no image of the Sun 518, with edge pixels 520 between both. If the image of the Sun is only partially present in the reflector as seen from the camera, the expected radiation incident on the thermopile is concordantly less. If the reflector surface is not flat, the image of the Sun will be distorted, and the expected radiation from the Sun may be higher or lower due to this effect. In any case, however, the expected radiation maintains its direct proportionality with the number of pixels of the camera's image in which the image of the Sun is present.

Figure 6:
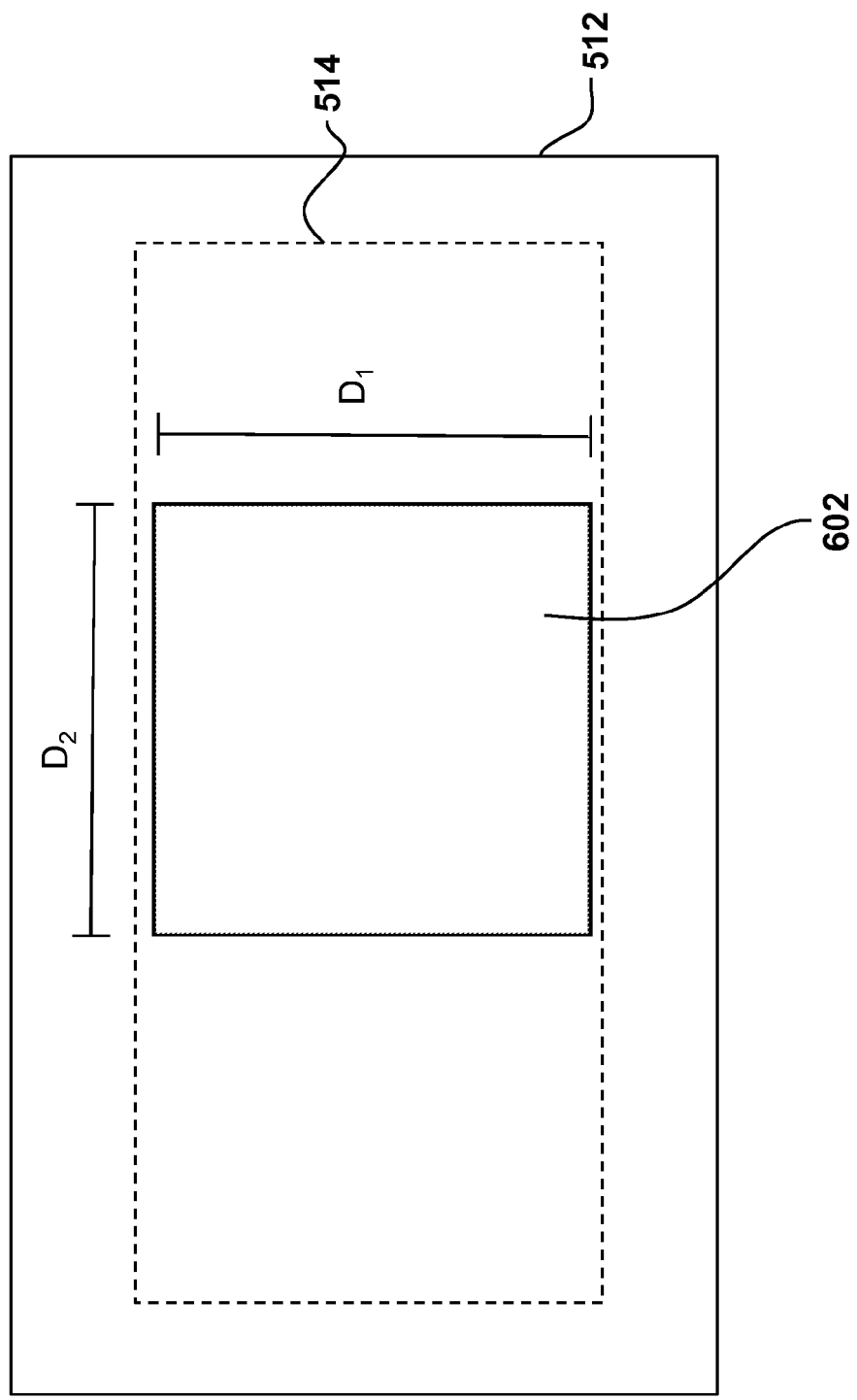
FIG. 6 is an exemplary digital image of a surface with known dimensions and surface reflectivity.

FIG. 6 is an exemplary digital image 512 and thermopile measurement area 514 of a surface 602, e.g., a cleaned heliostat, with known dimensions ($D_1$, $D_2$) and surface reflectivity. In some embodiments, the reflectivity measurement system may be calibrated based on manufacturer specifications. In other embodiments, a calibration sample may be required to obtain the angular length of a pixel and/or reflectivity. For example, one may obtain a measurement of reflectivity from a surface with a known reflectivity, e.g., a clean heliostat, and use this to determine a scaling factor between the number of illuminated pixels and the absorbed radiation:

Scaling Factor=(Number of pixels)*Known Reflectivity/(Absorbed radiation)

Using the scaling factor, the reflectivity of a surface which was otherwise unknown can be determined:

Reflectivity=(Absorbed radiation)/(Number of pixels)*(Known Scaling Factor)

Figure 7:
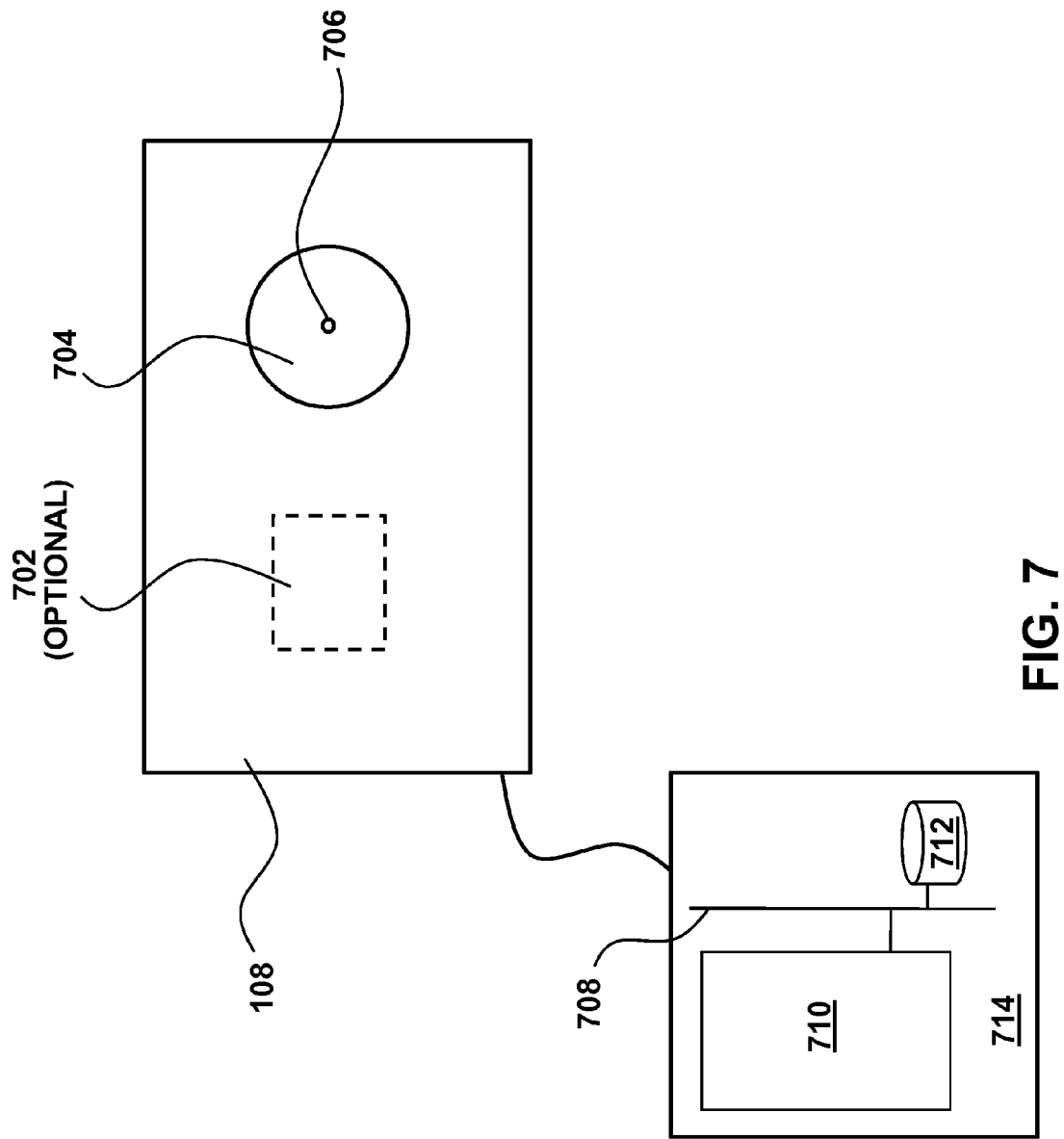
FIG. 7 depicts another exemplary embodiment of a reflectivity measurement system.

FIG. 7 depicts another exemplary reflectivity measurement system 108. In this exemplary embodiment, a single optical camera 704 is placed on the reflectivity measurement system and mounted to a tower near one or more heliostat arrays, e.g., a solar thermal receiver tower or optional camera tower, and aimed at the one or more heliostat arrays. The camera 704 may have a relatively narrow field of view, e.g., 3-4 degrees across. The reflectivity measurement system 108 may aim the camera 704 at a particular heliostat, which will reflect sunlight into the camera. The camera 704 may have a gain, filtering, and exposure setting so that the image of the Sun may not be saturated in the camera 704. The reflectivity of the particular heliostat may be determined by comparing the brightness, measured via the pixel value of the captured image, of the Sun-image in the heliostat to a similar image taken by redirecting the camera 704 to capture an image of either the Sun directly (see FIG. 4B), or the Sun-image in a reflector of known reflectivity, e.g., a clean mirror (see FIG. 6, without a thermopile measurement area). The reflectivity measurement system 108 may also comprise a separate device dedicated to measuring DNI 702, e.g., a pyrheliometer, which must be placed relatively close, e.g., 100 m or less, to the camera 704. This device 702 may be located near the heliostat field or on a separate tower and/or preexisting structure. The delay between the DNI measurement and the image of the heliostat to be measured should be minimized to yield a more accurate result. Any error introduced by such a delay depends on the variability of the DNI in both space and time. For example, on a clear day, a reasonable error due to this effect may be obtained by measuring DNI within approximately five minutes of obtaining an image and/or by a distance of the DNI measuring device 702 to the camera 704 of approximately 100 m. On a day with variable weather conditions, the time between the measurements obtained and/or the distance between the measuring devices may need to be reduced to obtain a result within an acceptable range of error. The reflectivity measurement system 108 may be connected to one or more control processing units 714 having a processor 710 and memory 712 addressable with a data bus 708. The one or more processing units 714 may be used to determine values, e.g., a solar disc pixel count and a reflectivity estimate, based on inputs from the camera 704 and the DNI measuring device 702.

Figure 8:
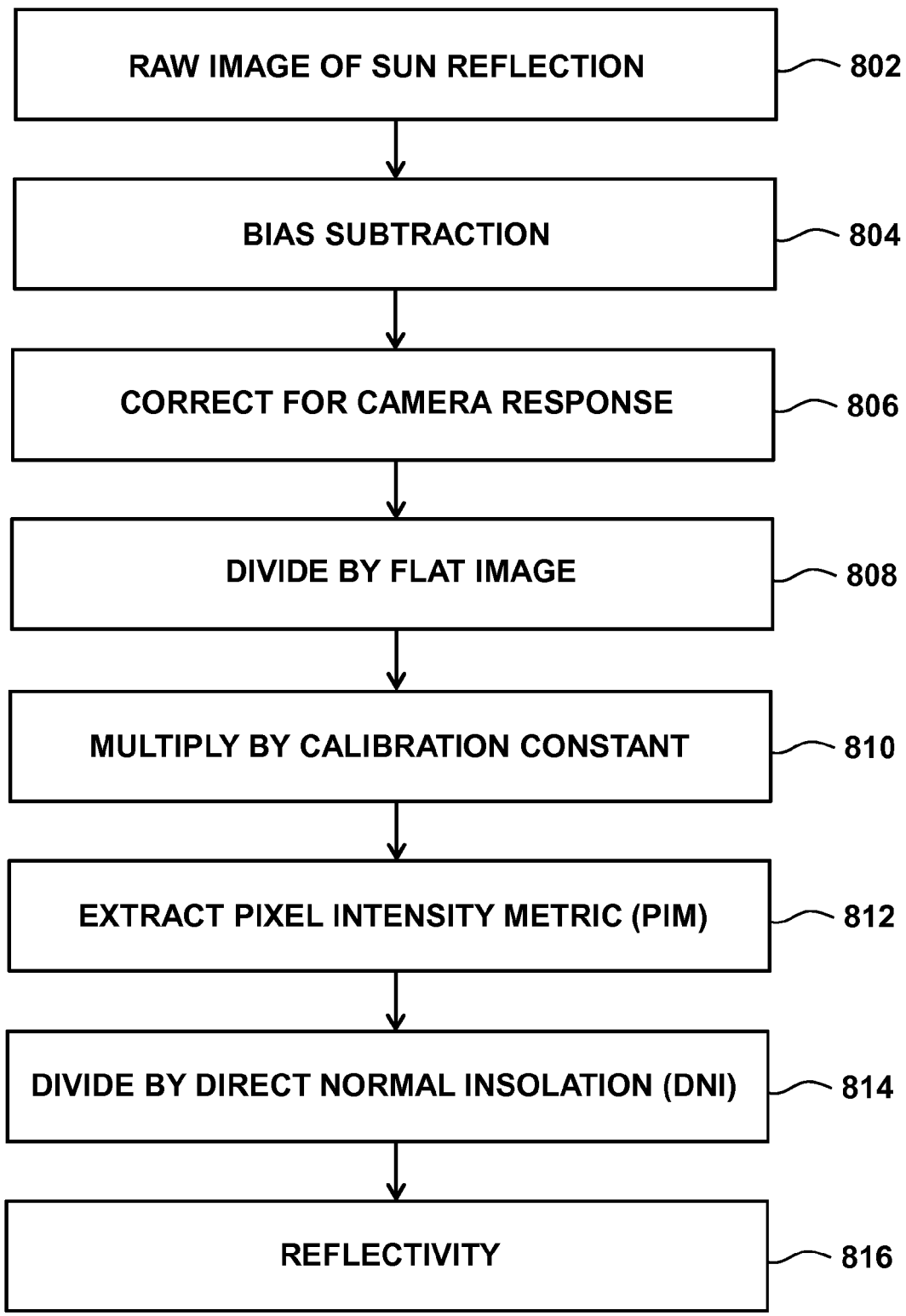
FIG. 8 is a flowchart of another exemplary embodiment of a reflectivity measurement system.

FIG. 8 is a flowchart of another exemplary reflectivity measurement system. Several considerations must be accounted for by the reflectivity measurement system 108 for this photometric approach of FIG. 7 to yield accurate results. First, the system starts with a raw image of the Sun reflection (step 802). Then, the system applies bias subtraction to the image (step 804). The bias may depend on camera gain, but should be independent of camera filtering and camera exposure. In dark images, the real "zero" value may usually be reported as a non-zero value, e.g., ten. Once this non-zero value is identified, it is subtracted off. In some embodiments, the bias subtraction step (step 804), may be included in the mapping from flux to pixel intensity (step 806), where that relationship may have a non-zero intercept, and resulting in the same calibration.

Next, the system corrects for camera response (step 806). To produce an image of the Sun that is proportional to the actual incident flux, for this example, the camera's response to incident flux must be appropriately accounted for. Cameras may exhibit a non-linear response to incident flux, and this response may be characterized on an individual camera basis by collecting multiple images of the Sun at different DNI values. Since the true intensity of the incident light is known and the response is measured in each image, the overall response to flux may be determined There may be variations from camera-to-camera due to either manufacturing tolerances of the camera itself, the filters, the optics assembly, and/or any analogue settings such as the aperture or zoom. Therefore, each camera should be individually calibrated.

Next, the system divides by a flat image (step 808). To produce an image which has the same mapping from incident flux to pixel intensity everywhere in the image, any non-flatness must be corrected for in a pre-processing phase. These non-flatness profiles may be caused by vignetting, e.g., due to the shape of the optics of the lens, which may cause the center of the image to be brighter than the edge of the image, by intrinsic differences in pixel sensitivities, and/or by the read-out properties of the imaging sensor itself. These effects may be characterized in a single experiment. One must construct an image which, in an ideal camera, would be perfectly flat. The resulting—typically non-flat—image is a map of the combination of these effects for the given configuration of the camera. One may produce this "flat" image by, for example, placing the camera very close to a frosted glass and/or plastic translucent surface and illuminating that surface from the side opposite the one facing the camera with a bright light. If the camera is focused at infinity, or at least at a very far distance as compared to the camera's distance to the frosted surface, the image will appear as completely blurred and the incident flux will be uniform across all pixels. Then, the system multiplies by a calibration constant (step 810).

Next, the system extracts the Pixel Intensity Metric (PIM) (step 812). Once calibrated images of the Sun have been obtained (step 810), a single metric of "brightness", the PIM, must be extracted. This step may be exacerbated by two noise issues: mirror-non-flatness distorting the image of the Sun, and non-uniform contamination of the reflector surface. Due to non-flatness, the distribution of pixel intensities in the Sun-image may not be constant, and therefore a metric that uses only that distribution may not be valid. Because of non-uniform contamination, the brightest pixel may not necessarily be representative of the average cleanliness, and so a "brightest pixel" metric similarly may not be used. The preferred technique is for the system to detect the blob of the image of the Sun, erode away pixels near the boundary, and calculate an average pixel value from the remainder.

Next, the system divides by DNI (Step 814). Due to the changing brightness of the Sun over time as seen from the ground, due to motion across the sky and atmospheric changes, the image brightness of the image captured by the camera may be negatively affected. To correct for this effect, the DNI may be measured by a separate device, which may be located nearby at the plant, and within a determined distance, e.g., 100 m or less, to the camera. The image brightness may then be scaled by the change in DNI between the first point in time the control image was taken and the second point in time the heliostat image was measured. In some embodiments, the first point in time and the second point in time may be simultaneous or close together. Finally, the system determines the reflectivity of the surface in the image (step 816). The reflectivity of the image may be calculated as:

Reflectivity of test image=(Reflectivity of control image, which is 100% in the case of a direct Sun measurement)*(DNI during control image)/(DNI during test image)*(PIM during test image)/(PIM during control image)

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A heliostat reflectivity measurement system comprising:
   a control processing unit comprising a processor and addressable memory; the control processing unit configured to:
   receive an image from a imaging device having a field of view;
   receive a reading of total energy absorbed by a thermopile having a field of view within the field of view of the imaging device;
   determine a total number of pixels in the received image containing part of an image of the solar disc; and
   determine a reflectivity estimate based on the determined total number of pixels in the received image containing part of the image of the solar disc and the received reading of total energy absorbed by the thermopile.

2. The heliostat reflectivity measurement system of claim 1 wherein the determined reflectivity estimate is further based on an angular size of a pixel in the received image and a surface brightness of the solar disc.

3. The heliostat reflectivity measurement system of claim 2 wherein the control processing unit is further configured to:
   calibrate the angular size of a pixel based on the number of pixels in a received image of an object with a known size and wherein the object is a known distance from the imaging device.

4. The heliostat reflectivity measurement system of claim 2 wherein the control processing unit is further configured to:
- receive a measurement of the direct normal insolation provided by the solar disc;
- receive an angular size of the solar disc; and
- determine the surface brightness of the solar disc based on the received measurement of direct normal insolation and received angular size.

5. The heliostat reflectivity measurement system of claim 1 wherein the control processing unit is further configured to:
- determine a scaling factor based on a received reading of total energy absorbed by a thermopile for a received image of a surface with a known reflectivity.

6. The heliostat reflectivity measurement system of claim 5 wherein the determined reflectivity estimate is further based on the scaling factor.

7. The heliostat reflectivity measurement system of claim 6 wherein the scaling factor is the product of the total number of pixels in the received image containing part of an image of the solar disc and the known reflectivity of the surface divided by the received reading of total energy absorbed by the thermopile.

8. The heliostat reflectivity measurement system of claim 6 wherein the determined reflectivity estimate is the received reading of total energy absorbed by the thermopile divided by the product of the total number of pixels in the received image containing part of an image of the solar disc and the scaling factor.

9. The heliostat reflectivity measurement system of claim 2 wherein the determined reflectivity estimate is the received reading of total energy absorbed by the thermopile divided by the product of the total number of pixels in the received image containing part of an image of the solar disc, the angular size of a pixel in the received image, and the surface brightness of the solar disc.

* * * * *